United States Patent [19]

Siman

[11] 4,010,544
[45] Mar. 8, 1977

[54] VIBRATION REDUCING SYSTEM FOR SINGLE CYLINDER FLUID PRESSURE ENGINE

[75] Inventor: Alfred W. Siman, Rivervale, N.J.

[73] Assignee: Textron, Inc., Providence, R.I.

[22] Filed: Mar. 21, 1975

[21] Appl. No.: 560,702

[52] U.S. Cl. .................... 30/381; 173/162
[51] Int. Cl.² ............ B27B 17/02; F16F 1/18
[58] Field of Search ........... 92/140, 161; 30/381, 30/382, 383, 384, 380, 385, 386, 387; 173/162, 83

[56] References Cited

UNITED STATES PATENTS

| | | | |
|---|---|---|---|
| 3,224,473 | 12/1965 | Dobbertin | 30/383 |
| 3,542,095 | 11/1970 | Frederickson | 30/381 |
| 3,593,804 | 7/1971 | Snider | 30/381 X |
| 3,680,608 | 8/1972 | Emmerich | 30/381 |
| 3,698,455 | 10/1972 | Frederickson et al. | 30/381 |
| 3,845,557 | 11/1974 | Bailey | 30/381 |

*Primary Examiner*—Al Lawrence Smith
*Assistant Examiner*—J. C. Peters
*Attorney, Agent, or Firm*—Robert E. Burns; Emmanuel J. Lobato; Bruce L. Adams

[57] ABSTRACT

In a vibration reducing system for a single cylinder engine, the rotating inertia forces are balanced while the reciprocating inertia forces are left unbalanced. The engine is mounted on a support by a spring biased linkage system permitting movement of the engine in a direction axial of the engine cylinder. The engine support also includes torsion mounts permitting controlled rotary movement of the engine about the crankshaft axis. Power transmission is through a drive shaft mounted on the support and connected with the engine crankshaft by a belt drive. The supporting linkage is biased to position the engine with the axis of the cylinder approximately normal to a plane defined by the axes of the crankshaft and the drive shaft.

23 Claims, 6 Drawing Figures

VIBRATION REDUCING SYSTEM FOR SINGLE CYLINDER FLUID PRESSURE ENGINE

FIELD OF INVENTION

The present invention relates to a system for reducing vibration of a single cylinder fluid pressure engine. The term "engine" is herein used in a broad sense to include motors, pumps and compressors.

BACKGROUND OF INVENTION

The single cylinder reciprocating engine has become widely used in the compressor and engine industry by reason of its low cost, light weight, reliability and versatility. Unfortunately it has one major disadvantage, namely vibration. The vibration of a single cylinder engine originates from the reaction of all of the following vibration forces on the casing of the device:

1. The rotating inertia forces of the crank and of the parts that revolve with it;
2. The reciprocating inertia forces of the piston and of the parts that reciprocate with it;
3. The inertia torque of the reciprocating parts;
4. The inertia torque produced by the pendulum motion of the connecting rod;
5. The torque variations produced by the varying gas pressure acting on the piston. A low cost solution to the vibration problem would make the single cylinder engine an ideal commercial mechanism. Attempts to solve the problem have been the subject of much research and experimentation. To eliminate the vibration it is necessary to deal with all five vibration sources. Efforts to date have been concentrated on the first three:

1. The rotating inertia forces can be completely eliminated by the use of rotating counterweights;
2. Elimination of the reciprocating inertia forces is possible by the use of dummy mechanisms or equivalent gear systems at a considerable sacrifice in cost, weight, reliability and simplicity;
3. Elimination of the reciprocating inertia forces eliminates the inertia torque produced by the reciprocating parts. Except for the possible use of rotating gears, no solution is known to exist for eliminating the inertia torque produced by the pendulum motion of the connecting rod. However, the torque created by oscillation of the connecting rod is small and is commonly neglected. This still leaves the vibration torque of the gas pressure differentials to be resolved. The only known solution to this is the use of multiple cylinder arrangements which only reduce the gas torque fluctuations at a considerable sacrifice in cost and simplicity.

An alternative solution to the inherent vibration problem of a single cylinder fluid pressure engine is to permit the engine to vibrate in space and seek to minimize the transmission of the vibratory forces to the base mount. Unfortunately such systems permit the drive shaft of the engine to orbit usually in all three planes so that power transmission to or from the shaft is difficult. While many proposals have heretofore been made, none has been found to provide a low cost practical solution to the problem.

SUMMARY OF INVENTION

It is an object of the present invention to provide a simple, low cost and practical means of effectively reducing the vibration transmitted by a single cylinder fluid pressure engine to its mounting or case and yet be able reliably to transmit power to or from the engine. This object is achieved by the combined effect of eliminating certain vibration forces and by mounting the engine in such manner that the remaining vibration forces are not transmitted to the base or casing. At the same time the mounting of the engine permits the reliable transmission of power to or from the engine without transmission of vibration.

In accordance with the invention the rotating inertia forces are eliminated by the use of counterweights while the reciprocating inertia forces are left unbalanced. These reciprocating inertia forces tend to produce reciprocatory vibration of the engine in a direction axial of the engine cylinder. However, the engine is isolated from its base or support by being mounted with a spring loaded linkage system which permits movement of the engine relative to the support in a direction approximately axial of the engine cylinder while restraining movement in a transverse direction. Power transmission is accomplished in a simple manner by means of a belt drive with one pulley mounted on the crankshaft of the engine and another mounted on a second shaft rotatably supported on the base. Although the linkage system by which the engine is mounted on the base permits movement of the engine in a direction axial of the engine cylinder, there is no change in the center to center distance of the pulleys and hence the belt drive is not affected by the engine movement. The amplitude of such engine movement is determined by the relationship:

$$\text{Movement of Engine} = \frac{\text{Weight of reciprocating parts} \times \text{movement of reciprocating parts}}{\text{Weight of non-reciprocating parts of engine}}$$

and is accordingly quite small. For example for a chain saw engine the engine movement in a direction axial of the engine cylinder may be of the order of 0.03 inch. By choosing a relatively long link the arc motion of the movable end of the link can be made to approximate straight line motion.

Preferably the center of mass of the engine (when the piston is midway of its stroke) lies approximately on the axis of the crankshaft. With this location of the center of mass torque variations will cause the engine to rotate about the crankshaft bearings without imposing any additional vibratory loads. Location of the center of mass on the crankshaft axis can be accomplished by proper proportioning of the engine, by selectively locating some of the standard accessories for example the ignition module or by adding ballast. Torsion mounts are suitably provided to isolate torsional vibration of the engine from the base or support.

The linkage system by which the engine is mounted on the base is biased to a neutral position (under load) in which a plane defined by the axis of the crankshaft and the axis of the shaft rotatably mounted on the base is approximately normal to the axis of the engine cylinder. This biasing is conveniently effected by constructing the linkage system of spring links connected at one end with the engine and at the other end with the support. Vibratory movement of the engine in a direction axial of the engine cylinder is thus permitted by flexing of the links. Hence no additional spring means is required for restoring the system to neutral position.

Preferably the links are arranged to provide a parallelogram linkage system by which the engine is supported.

The construction in accordance with the present invention thus provides a simple, low cost practical means of transmitting power to or from the engine crankshaft while effectively isolating the engine support or casing from engine vibration. In transmitting power to or from the engine a speed reduction or speed increase is conveniently attained by suitable selection of pulley size.

The vibration reducing system in accordance with the invention is suitable for many applications of which the following are examples:

1. Chain saws and other hand-held power drive tools;
2. Single cylinder compressors for automobile and other air conditioning systems, refrigerators and other applications;
3. Lawn mowers including ride-on lawn mowers snowmobiles, garden tractors and other small implements and vehicles. In general, the vibration reducing system in accordance with the invention is applicable wherever single cylinder engines or compressors are used.

BRIEF DESCRIPTION OF DRAWINGS

The nature, objects and advantages of the invention will be more fully understood from the following description in conjunction with the accompanying drawings which illustrate a preferred embodiment of the invention and in which.

DESCRIPTION OF PREFERRED EMBODIMENT

Figure 1:
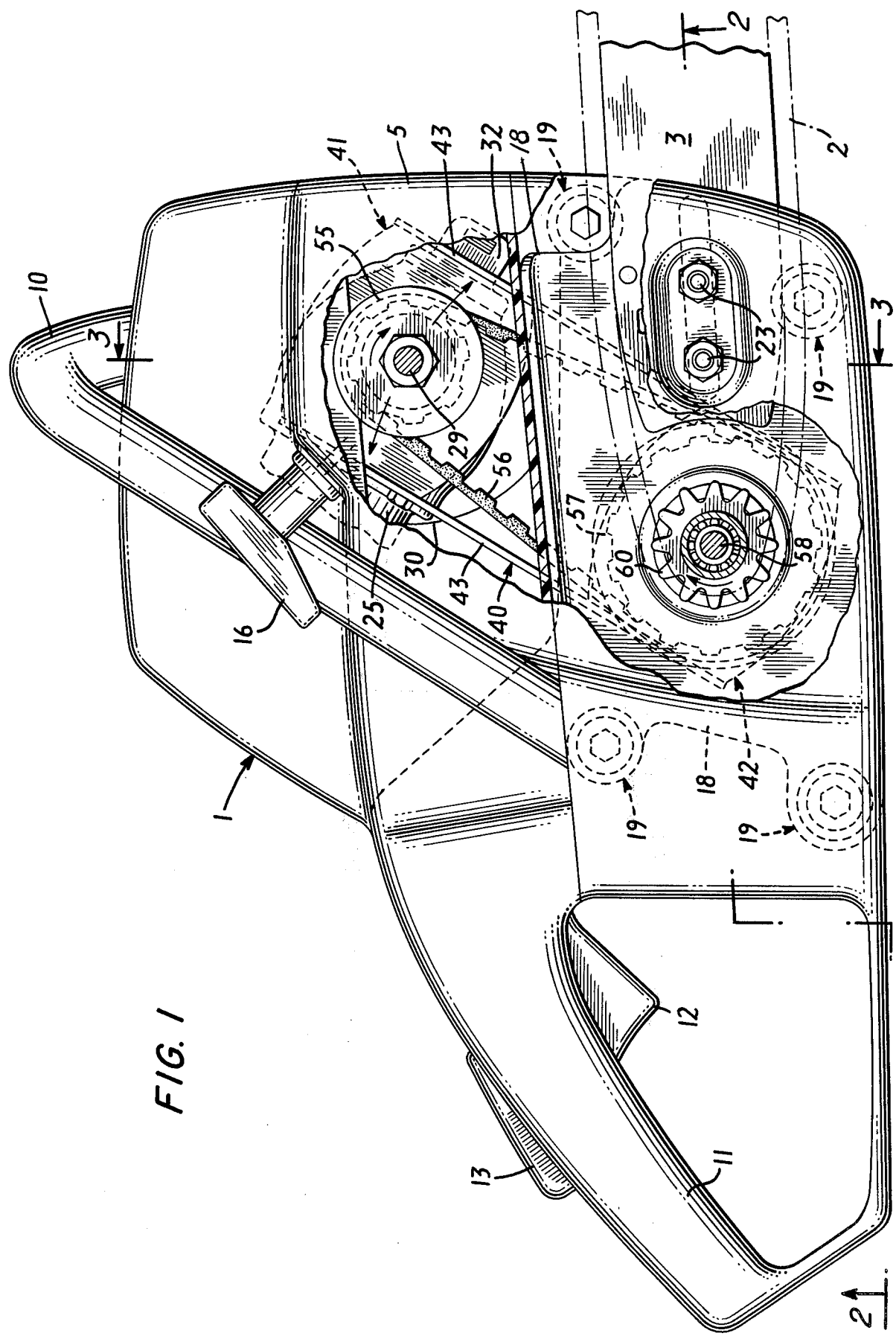
FIG. 1 is a partial side view of a chain saw powered by a single cylinder internal combustion engine and embodying a vibration reducing system in accordance with the present invention.
Figure 2:
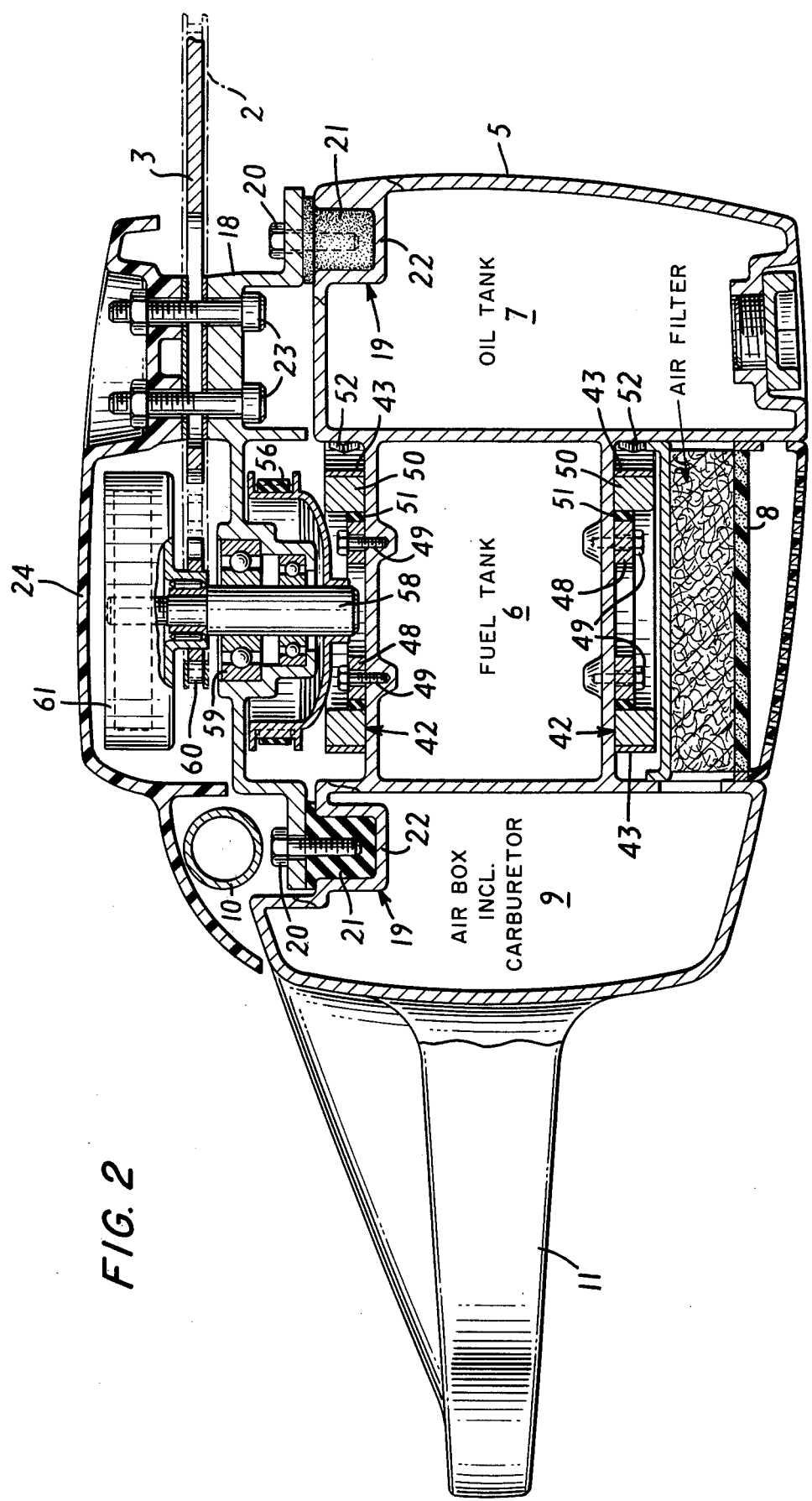
FIG. 2 is a sectional view taken approximately on the line 2—2 in FIG. 1.
Figure 3:
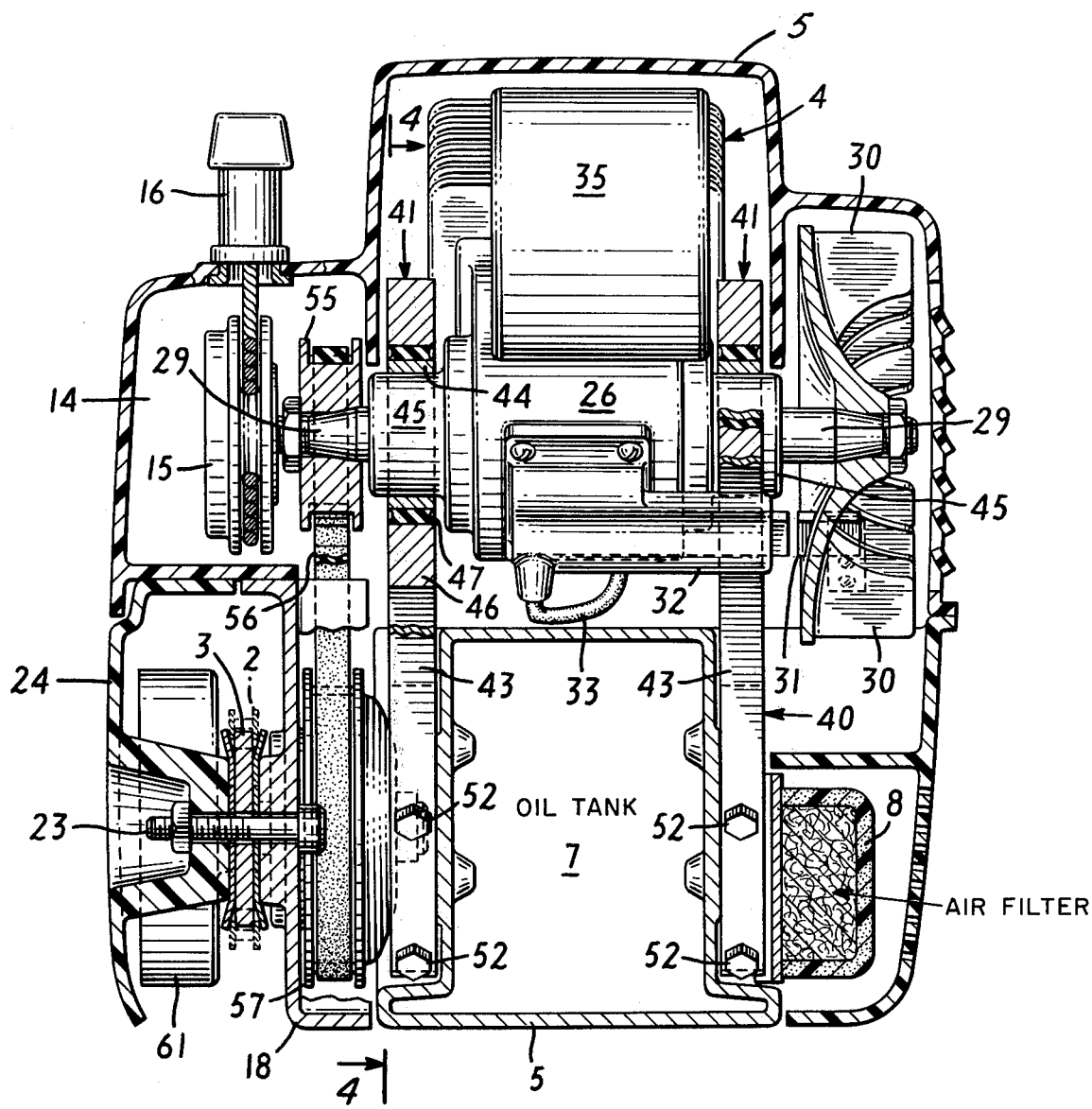
FIG. 3 is a sectional view taken approximately on the line 3—3 in FIG. 1.
Figure 4:
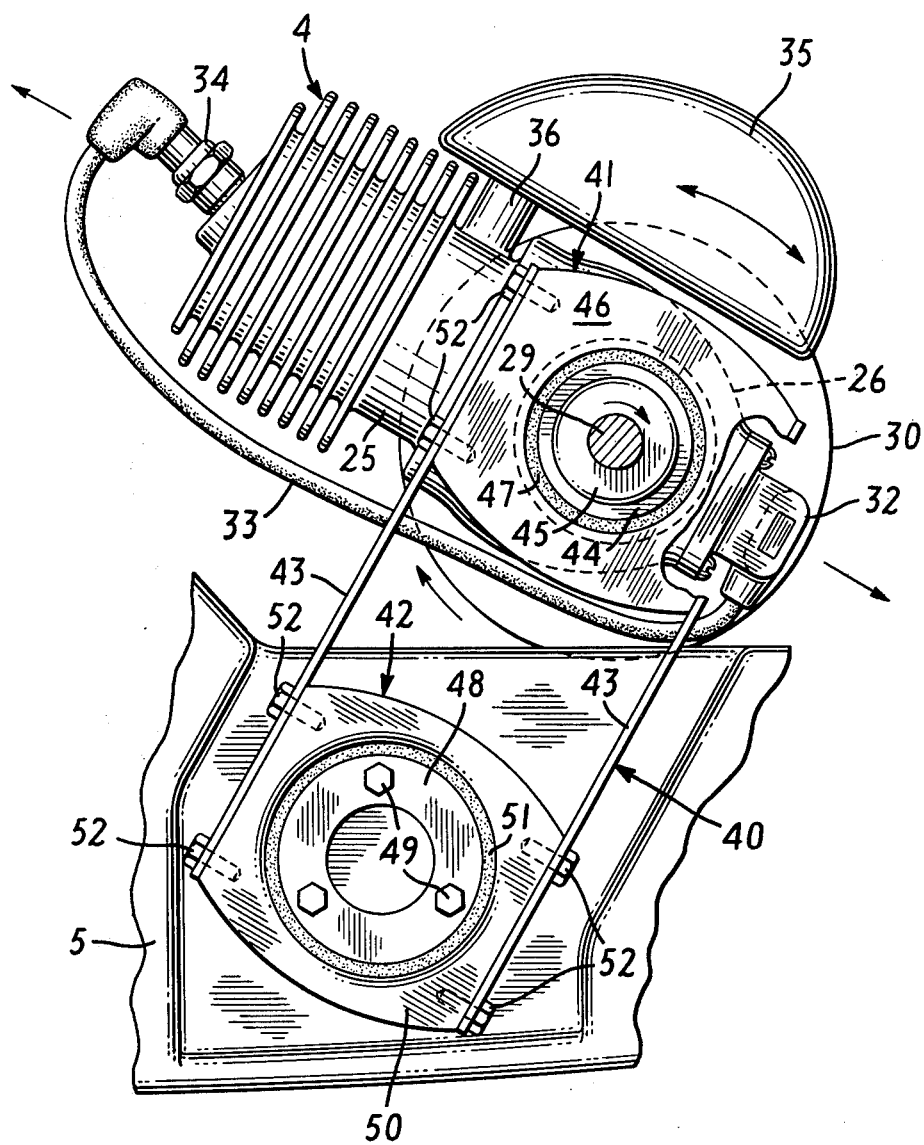
FIG. 4 is a sectional view taken approximately on the line 4—4 in FIG. 3.
Figure 5:
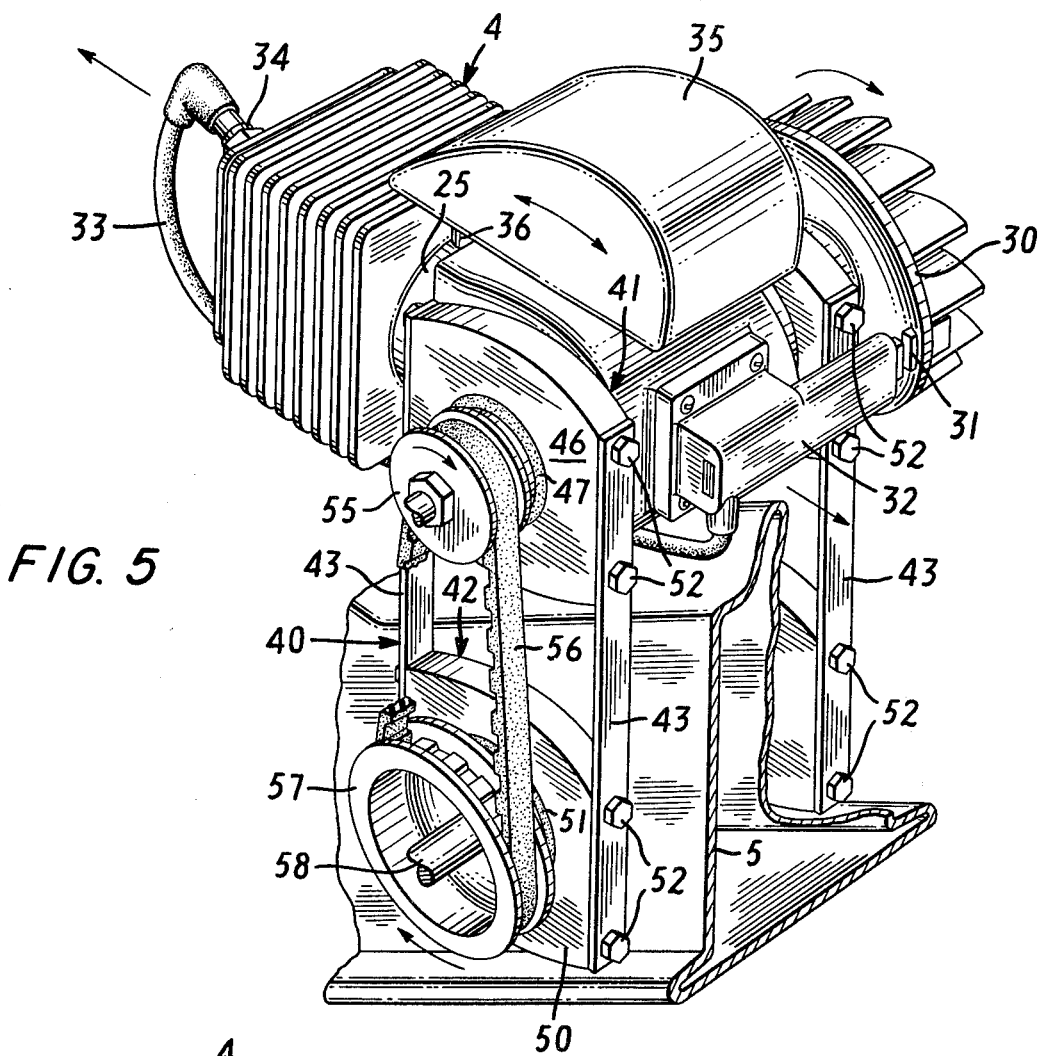
FIG. 5 is a schematic perspective view showing the engine and its mount.
Figure 6:
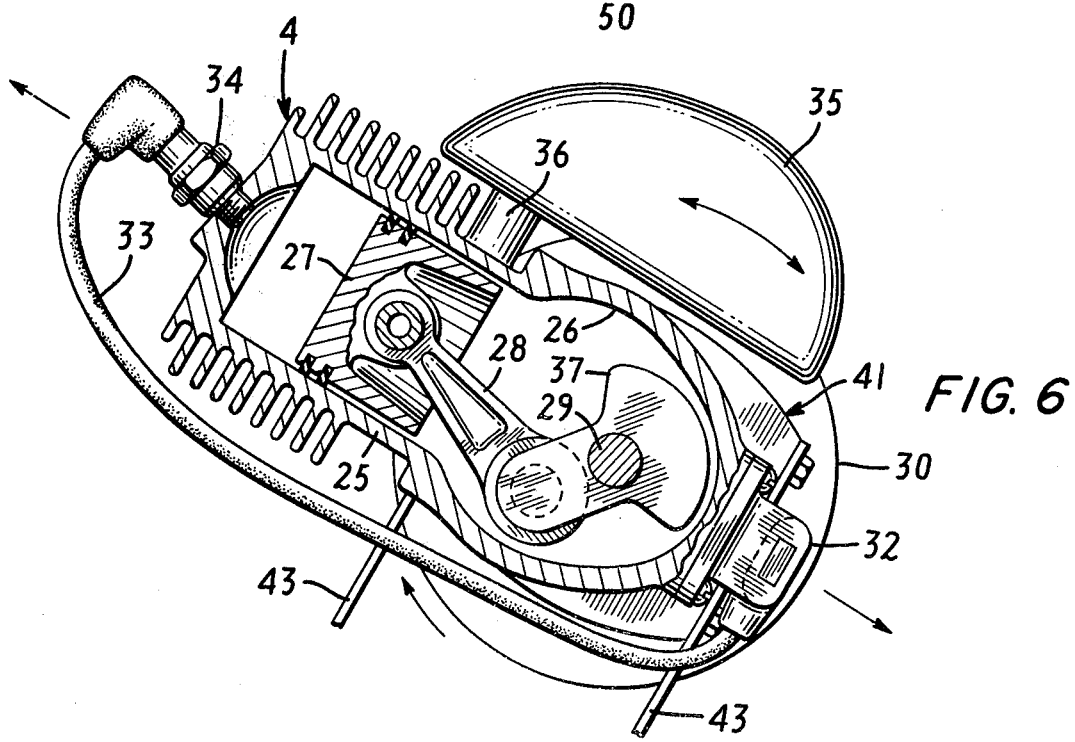
FIG. 6 is a schematic axial section of the engine illustrating the balancing of rotating parts.

A vibration reducing system in accordance with the invention is shown by way of example in the drawings embodied in a chain saw comprising a power head 1 driving a cutting chain 2 which runs on a guide bar 3 affixed to the power head. Power is supplied by a single cylinder internal combustion engine 4 mounted in a housing or casing 5 which provides a support and an enclosure for the engine. The housing 5 provides a fuel tank 6, an oil tank 7, a compartment for an air filter 8 and an air box 9 for a carburetor supplying a fuel air mixture to the engine. The housing is provided with a wraparound type tubular front handle 10 and a rear handle 11 for holding and manipulating the chain saw. The handles are fixed relative to the housing. The rear handle 11 is provided with a trigger 12 controlling the supply of fuel to the engine and hence the speed of the engine and a trigger lock 13. The housing further provides a compartment 14 for a starter 15 operable by means of a handle 16.

A support bracket 18 is mounted on one side of the housing by four vibration isolators 19. Each of the vibration isolators is shown as comprising a bolt 20 extending through a hole in the support bracket 18 into a body of rubber or other suitable elastomeric material 21 bonded in a cup-shaped recess 22 provided in the housing 5. The guide bar 3 is mounted on the support bracket 18 by means of two bolts 23 which also secure in place a drive case cover 24. The vibration isolation mounts 19 provides a firm support for the bracket 18 and the guide bar 3 so that manipulation of the guide bar in use of the chain saw is fully controllable by the operator while any vibration generated in the guide bar is isolated from the housing 5 and hence from the handles 10 and 11 by which the chain saw is held.

The engine 4 is illustrated as a single cylinder two stroke cycle internal combustion engine having a cylinder 25 and a crankcase 26. A piston 27 reciprocable in the cylinder 25 is connected by a connecting rod 28 with a crankshaft 29 rotatably supported by suitable bearings in the crankcase 26. The crankshaft extends from opposite sides of the crankcase. A rotor 30 which serves as a flywheel and also as a cooling fan for the engine is mounted on one end of the crankshaft while the opposite end is connected with the starter 15. The rotor also carries a permanent magnet 31 which cooperates with an ignition module 32 connected by an insulated wire 33 with a spark plug 34 in the cylinder head to provide ignition for the engine. A muffler 35 is connected with the exhaust port of the engine by an exhaust pipe 36.

Counterweights 37 on the crankshaft 29 balance the crankshaft so that rotating inertia forces of the crankshaft and of parts that revolve with it are completely eliminated. However, only the rotating forces are balanced. The reciprocating inertia forces of the piston and the parts that reciprocate with it are left wholly unbalanced and hence produce reciprocatory movement of the engine in a direction axial of the cylinder. The engine is so designed that the center of mass of the engine —when the piston is midway of its stroke— is located approximately on the axis of the crankshaft. This is achieved by suitable proportioning of the engine parts and by locating accessories such as the ignition module 32 on the crankcase opposite the engine cylinder. If necessary, suitable ballast can be added to achieved the desired balance. By reason of the center of mass of the engine being located approximately on the axis of the crankshaft, any torque variations will cause the engine to rotate about the crankshaft bearings without imposing any additional vibratory loads.

In accordance with the present invention the engine 4 is mounted in the housing 5 in such manner as to isolate the housing from torsional vibration of the engine and also from the reciprocatory inertia forces produced by reciprocation of the piston and the associated parts that move with it. The engine is mounted in such manner as to permit it to move in a direction approximately axial of the engine cylinder while restraining transverse movement. As shown by way of example in the drawings, the engine mount comprises torsional vibration isolators concentric with the engine and at the other end with the housing. Moreover means is provided for biasing the engine to a neutral position in which the axis of the engine cylinder is approximately normal to the linkage. The biasing means is conveniently integrated with the linkage by using leaf springs as the links.

The linkage 40 supporting the engine is shown by way of example as comprising upper torsion mounts 41, lower torsion mounts 42 and connecting links 43. The terms "upper" and "lower" are used only as a convenient means for identifying the torsion mounts as illustrated in the drawings and are not intended to limit the orientation of the engine or its mounting system. While other types of torsion mounts, for example mechanical spring torsion mounts, can be used, it is considered preferable to use elastomeric mounting means. As illustrated by way of example in the drawings the upper torsion mounts 41 comprise inner rings 44 which surround and are fixed to cylindrical supporting portions 45 projecting from opposite sides of the crankcase concentric with the axis of the crankshaft. The supporting portions 45 can if desired serve as inner members of the torsion mount so that separate rings 44 are not required. The inner members of the torsion mounts are surrounded by outer members 46 with a ring of rubber or other elastomeric material 47 interposed between the inner and outer members and bonded to them. The outer members 46 are shown as being generally rectangular with two straight sides and two convexly curved sides.

The lower torsion mounts 42 are shown as comprising inner rings 48 secured to the housing 5 (on opposite sides of the fuel tank 6) by screws 49 and an outer member 50 which surrounds the inner member 48 with a ring of rubber or other elastomeric material 51 interposed between the inner and outer members and bonded to them. The outer members 50 are similar in size and shape to the outer members 46 of the upper torsion mounts.

The links 43 are shown as comprising leaf springs which connect the upper and lower torsion mounts by being secured to opposite straight sides of the upper and lower outer members 46, 50 by means of screws 52. The two links connecting each pair of torsion mounts are disposed parallel to one another and equidistant from the centers of the respective torsion mounts. The upper and lower torsion mounts together with the connecting links 43 thus constitute a parallelogram linkage system which permits movement of the engine in a direction axial of the engine cylinder without angular movement.

Power takeoff from the engine is provided by means of a pulley 55 fixed on the crankshaft 29 between the crankcase 26 and the starter 15. A belt 56 running on the pulley 55 drives a second pulley 57 fixed on a stub shaft 58 rotatably mounted on the support bracket 18 by antifriction bearings 59. The belt 56 is shown by way of example as a timing belt which has the advantage of providing a positive drive. However, any other suitable type of flexible belt or link belt can be used as desired. Alternatively, the crankshaft 29 and stub shaft 58 can be otherwise operatively connected with one another, for example by gears. The stub shaft 58 is concentric with the lower torsion mount 42. Hence, movement of the engine as permitted by the linkage system and the torsion mounts does not cause any viriation in the center to center distance of the pulleys.

The chain 2 running on the guide bar 3 is driven by a sprocket 60 which is rotatable on the stub shaft 58 and is coupled with the shaft —when the engine speed exceeds a selected critical value— by a centrifugal clutch 61 mounted on the outer end of the stub shaft 58.

By reason of their inherent resilience, the leaf springs 40 serve not only as links of the parallelogram linkage supporting the engine but also serve as springs biasing the engine to a selected neutral position. The orientation of the engine with respect to the linkage by which it is mounted in the housing and the spring constant of the bias are so selected that then the engine is operating under normal load the axis of the engine cylinder is approximately normal to a plane defined by the axes of the engine crankshaft 29 and the stub shaft 58. With this relationship axial shaking forces produced by reciprocation of the engine piston and the parts that move with it are not transmitted to the housing. The spring constant of the leaf springs 43 is selected so that the engine is relatively free to move in a direction axial of the engine cylinder. However, the amplitude of such movement is in practice quite small being for example of the order of 0.03 inch. The housing is also isolated from torsional vibration by the upper torsion mount which permits controlled angular movement of the engine about the axis of the crankshaft in response to torque variations. As the center of mass of the engine is approximately coincident with the axis of the crankshaft and hence with the axis of the upper torsion mounts, such angular movement of the engine does not impose any additional vibratory loads on the system.

Moreover, with the vibration reducing system of the present invention power transmission is no longer a problem. As the stub shaft 58 on which the chain driving sprocket 60 is rotatably mounted is supported on the same support bracket 18 to which the guide bar 3 is secured, the axis of the sprocket 60 is fixed with respect to the guide bar. The position of the stub shaft 58 is not affected by any vibratory movement of the engine. Moreover, the distance between centers of the pulleys 55 and 57 remains essentially constant. The power takeoff in accordance with the invention has the further advantage that by suitable selection of the pulleys or other drive means connecting the two shafts, any desired increase or decrease of speed ratio can be obtained.

It will thus be seen that the invention deals effectively with the conflicting problems of isolating engine vibration from its support and at the same time providing convenient power transmission.

With the chain saw construction illustrated in the drawings a "stationary" system comprising the housing, including the fuel and oil tanks and carburetor chamber, the handles the stub shaft and guide bar is isolated from a "vibrating" system comprising the engine including the rotor and starter and accessories such as the ignition module mounted on the engine. Moreover a subassembly comprising the guide bar, chain, sprocket and the support on which the guide bar is mounted is isolated from the housing and handles so that vibration from the chain and sprocket are not transmitted to the operator.

While the invention has been shown by way of example as applied to a chain saw, it will be understood that it is equally applicable not only to other engine installations but also to pumps and compressors. Moreover, the invention is in no way limited to details of construction of the embodiment illustrated by way of example in the drawings. For example the centrifugal clutch may be located on the engine crankshaft instead of on the stub shaft. Still other modifications may be made as will be apparent to those skilled in the art.

What I claim and desired to secure by Letters Patent is:

1. A vibration reducing system for a fluid pressure engine having a cylinder, a crankcase, a piston reciprocable in said cylinder, a rotary drive shaft in said crankcase and means connecting said drive shaft and piston for coordinated rotation of said drive shaft and reciprocation of said piston, said system comprising, in combination with said engine, means for rotationally balancing said drive shaft and any parts that revolve with it, a support for said engine, means for mounting said engine on said support for movement relative to said support only in a direction approximately axial of said cylinder, said mounting means comprising parallelogram linkage means connected at one end to said engine and at the other end to said support, and means acting between said support and said engine to bias said engine to a position in which said linkage means is approximately normal to the axis of said cylinder, a second shaft rotatably mounted on said support laterally spaced from and parallel to said drive shaft with the axes of said shafts lying in a common plane approximately normal to the axis of said cylinder, and means rotationally connecting said second shaft with said drive shaft, said mounting means maintaining the distance between said shafts substantially constant.

2. A vibration reducing system according to claim 1, in which the center of mass of said engine is disposed approximately on the axis of said drive shaft.

3. A vibration reducing system according to claim 1, in which reciprocating inertia forces of the piston and parts moving with it are substantially unbalanced.

4. A vibration reducing system according to claim 1, in which said parallelogram linkage means comprises a plurality of leaf springs connected at one end to said engine and at the other end to said support, said leaf springs further comprising said biasing means.

5. A vibration reducing system according to claim 1, in which said means rotationally connecting said shafts comprises pulleys on said shafts and belt means running on said pulleys.

6. A vibration reducing system according to claim 1, in which said mounting means comprises a mounting structure supported by said linkage means and supporting said engine for controlled rotation about the axis of said drive shaft, and vibration damping means interposed between said mounting structure and said engine elastically to control angular movement of said engine relative to said mounting structure and thereby damp out torsional vibration of said engine.

7. A vibration reducing system according to claim 1, in which said crankcase is provided at opposite sides with supporting portions concentric with the axis of said drive shaft and in which said mounting means comprises mounting structures supported by said linkage means and supporting said engine by said supporting portions with vibration damping means interposed between said mounting structures and said supporting portions of the crankcase to permit elastically controlled angular movement of said engine about the axis of said drive shaft and thereby damp out torsional vibration of the engine.

8. A vibration reducing system according to claim 7, in which said linkage means comprises a pair of leaf springs supporting each of said mounting structures, the leaf springs of each pair being connected at one end to the respective mounting structure on opposite sides of the axis of said drive shaft and being connected at the opposite end to said support.

9. A vibration reducing system for a fluid pressure engine having a cylinder, a crankcase, a piston reciprocable in said cylinder, a rotary drive shaft in said crankcase and means connecting said drive shaft and piston for coordinated rotation of said drive shaft and reciprocation of said piston, said crankcase being provided at opposite sides with supporting portions concentric with the axis of said drive shaft, said system comprising, in combination with said engine, means for rotationally balancing said drive shaft and any parts that revolve with it, a support for said engine, means for mounting said engine on said support for movement relative to said support in a direction approximately axial of said cylinder, a second shaft rotatably mounted on said support laterally spaced from and parallel to said drive shaft, means acting between said support and said engine to bias said engine to a position in which a plane defined by the axes of said shafts is approximately normal to the axis of said cylinder, and means rotationally connecting said second shaft with said drive shaft, said mounting and biasing means comprising mounting members supporting said engine by said supporting portions of the crankcase with vibration damping means interposed between said mounting members and said supporting portions to permit controlled angular movement of said engine about the axis of said drive shaft, supporting members concentric with the axes of said second shaft and supported by said support with vibration damping means interposed between said supporting members and said support to permit controlled angular movement between said supporting members and said support and leaf springs connecting said mounting members respectively with said supporting members to permit controlled movement of said engine in a direction approximately axial of said cylinder while maintaining the distance between said shafts substantially constant.

10. A vibration reducing system according to claim 9, in which said leaf springs comprise a pair of springs connecting each of said mounting members with a corresponding supporting member, the leaf springs of each pair being approximately parallel to one another and being approximately equally spaced from a plane defined by the axes of said shafts.

11. In a chain saw comprising a housing having a support structure, handles affixed to said housing for holding and manipulating said chain saw, a guide bar affixed to said housing, a cutting chain running on said guide bar and an engine for driving said chain, said engine comprising a cylinder, a crankcase, a piston reciprocable in said cylinder, a rotary drive shaft in said crankcase and means connecting said drive shaft and piston for coordinated rotation of said drive shaft and reciprocation of said piston, a vibration reducing system comprising means for rotationally balancing said drive shaft and any parts that revolve with it, means for mounting said engine on said support structure of the housing for movement relative to said support structure only in a direction approximately axial of the engine cylinder, said mounting means comprising parallelogram linkage means connected at one end of said engine and at the other end to said support structure, and means acting between said support structure and the engine to bias the engine to a position in which said linkage is approximately normal to the axis of the engine cylinder, a second shaft rotatably mounted on said support structure laterally spaced from and parallel to said drive shaft with the axes of said shafts lying in common plane approximately normal to the axis of the engine cylinder, means rotationally connecting said second shaft with the drive shaft, and mounting means maintaining the distance between said shafts substantially constant, and a sprocket on said second shaft driving said cutting chain.

12. A vibration reducing system according to claim 11, in which the center of mass of said engine is disposed approximately on the axis of said drive shaft.

13. A vibration reducing system according to claim 11, in which reciprocating inertia forces of said piston and parts moving with it are substantially unbalanced.

14. A vibration reducing system according to claim 11, in which said mounting means comprises torsion mounts supporting said engine for controlled rotation about the axis of said drive shaft and said linkage connecting said torsion mounts with said support structure.

15. A vibration reducing system according to claim 14, in which said mounting means further comprises second torsion mounts mounted on said support structure, said linkage connecting said second torsion mounts with said first mentioned torsion mounts.

16. A vibration reducing system according to claim 15, in which said linkage comprises leaf springs connecting said second torsion mounts with said first mentioned torsion mounts, the resiliency of said leaf springs comprising said biasing means.

17. A vibration reducing system according to claim 16, in which said leaf springs together with said torsion mounts comprises a parallelogram linkage system providing for movement of said engine in the direction axial of the engine cylinder without angular movement of said engine.

18. A vibration reducing system according to claim 15, in which each of said torsion mounts comprises inner and outer members and a ring of elastomeric material interposed between said inner and outer members.

19. A vibration reducing system according to claim 11, in which said support structure comprises a support member vibrationally isolated from said housing, said second shaft and said guide bar being mounted on said support member.

20. A vibration reducing system according to claim 11, in which said linkage means comprises a plurality of leaf springs connected at one end with said engine and at the opposite end with said support structure, said leaf springs further comprising said biasing means.

21. A hand held chain saw comprising a housing having a support structure, handles affixed to said housing for holding and manipulating said chain saw, an engine comprising a cylinder, a crankcase, a piston reciprocable in said cylinder, a rotary drive shaft in said crankcase and means connecting said drive shaft and piston for coordinated rotation of said drive shaft and reciprocation of said piston, vibration reducing means mounting said engine on said support structure to permit controlled movement of said engine relative to said support structure and to inhibit transmission of vibration from said engine to said support structure, a secondary support member mounted on said support structure of the housing, means separate from said vibration reducing means vibrationally isolating said secondary support member from said support structure of the housing, said secondary support member being thereby vibrationally isolated from the engine by said isolating means and said vibration reducing means, a second shaft mounted for rotation on said secondary support member, said second shaft being laterally offset from said drive shaft, a chain guide bar mounted on said secondary support member, a cutting chain on said guide bar, a sprocket on said second shaft disposed in driving relation to said chain, and positive drive means rotationally connecting said second shaft with said drive shaft while inhibiting transmission of vibration from said engine to said support structure of said housing.

22. A chain saw according to claim 21, in which said means mounting said engine on said support comprises parallelogram linkage means and means biasing said linkage means to a normal position.

23. A chain saw according to claim 24, in which said linkage means and biasing means comprise a plurality of leaf springs connected at one end with said engine and at the opposite end with said support structure.

* * * * *